United States Patent
Isaki et al.

(10) Patent No.: US 8,614,002 B2
(45) Date of Patent: Dec. 24, 2013

(54) BOTH SURFACES-LAMINATED POLYESTER FILM

(75) Inventors: Kimihiro Isaki, Shiga-ken (JP); Masato Fujita, Shiga-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 90 days.

(21) Appl. No.: 13/496,573

(22) PCT Filed: Sep. 16, 2010

(86) PCT No.: PCT/JP2010/066093
§ 371 (c)(1),
(2), (4) Date: Apr. 5, 2012

(87) PCT Pub. No.: WO2011/034151
PCT Pub. Date: Mar. 24, 2011

(65) Prior Publication Data
US 2012/0189855 A1    Jul. 26, 2012

(30) Foreign Application Priority Data

Sep. 18, 2009 (JP) ................................. 2009-216531

(51) Int. Cl.
*B32B 27/40* (2006.01)
(52) U.S. Cl.
USPC .................. 428/423.7; 428/483; 428/500
(58) Field of Classification Search
USPC ............................ 428/423.1, 423.7, 483, 500
See application file for complete search history.

(56) References Cited

U.S. PATENT DOCUMENTS

2011/0051245 A1*  3/2011  Masuda et al. ................ 359/584

FOREIGN PATENT DOCUMENTS

| JP | 4-345634 | 12/1992 |
| JP | 2009-210911 | 9/2009 |
| JP | 2010-89307 | 4/2010 |

OTHER PUBLICATIONS

International Search Report for PCT/JP2010/066093, mailed Oct. 12, 2010.

* cited by examiner

*Primary Examiner* — Thao T. Tran
(74) *Attorney, Agent, or Firm* — Nixon & Vanderhye P.C.

(57) ABSTRACT

The present invention provides a both surfaces-laminated polyester film having a coating layer excellent in easy adhesion property to a hard coat layer and another coating layer having an ability of preventing precipitation of oligomer.

A both surfaces-laminated polyester film comprising:
  a polyester film,
  a first coating layer which is formed on one surface of said polyester film and comprises a polymer containing ammonium base, an acrylate polymer containing polyethylene glycol and a crosslinking agent, and
  a second coating layer which is formed on another surface of said polyester film and comprises a polyurethane resin and a crosslinking agent.

8 Claims, No Drawings

BOTH SURFACES-LAMINATED POLYESTER FILM

This application is the U.S. national phase of International Application No. PCT/JP2010/66093, filed 16 Sep. 2010, which designated the U.S. and claims priority to Japan Application No. 2009-216531, filed 18 Sep. 2009; the entire contents of each of which are hereby incorporated by reference.

TECHNICAL FIELD

The present invention relates to a both surfaces-laminated polyester film, and more particularly, to a both surfaces-laminated polyester film having a coating layer excellent in easy adhesion property to a hard coat layer and another coating layer having an ability of preventing precipitation of oligomer.

BACKGROUND ART

In application of touch panels, conventionally, as a position detecting method, there are employed various systems such as resistance film system and capacitance system. Of these, there has been a tendency of increasing the growth of resistance film system because of simple structure and advantageous cost performance. The touch panel structure using the resistance film system usually comprises a transparent conductive laminate and a transparent conductive glass having a thin film, which are placed opposite through a spacer, so that an electric current is applied to the transparent conductive laminate and a voltage in the transparent conductive glass having a thin film is measured. Namely, there is applied a principle where the transparent conductive laminate is contacted to the transparent conductive glass having a thin film when pushing thereof by a finger or a touch pen, and thereby an electric current is passed to the contacting part so that the position of contacting part is detected. As the application using the resistance film system, there are exemplified an automated teller machine and a display of train ticket machine.

The above transparent conductive laminate is a laminate having a conductive thin film which is formed on a film substrate. On the transparent conductive laminate, usually a hard coat layer is provided for the purpose of improving the transparency and withstanding the pushing operation in use of the touch panel.

In the touch panel production process, the transparent conductive polyester film having a thin film and the polyester film having a hard coat layer are attached through an adhesive layer (for example, refer to Patent Document 1), there is a problem that oligomers contained in the polyester film (usually an oligomer means a low molecular compound having cyclic trimer structure) are precipitated and crystallized on the surface of film causing to ingress of oligomers into the adhesive layer used for the adhesion of films so that the adhesive layer is deformed (for example, refer to Patent Document 2).

As a method of preventing the above oligomer precipitation, for example, there is proposed a method that a curable resin layer comprising a silicone resin and an isocyanate-based resin is provided on the polyester film deformed (refer to Patent Document 3). However, since the curable resin layer is formed by thermal curing, a heat treatment at a high temperature for the dissociation of the isocyanate-based resin and blocking agent is required so that much care in handling thereof is required because curls and slacks highly occur in the processing.

Therefore, when attaining reduction of the amount of oligomer precipitation by the method using the coating layer, it has been required that the coating layer has more excellent heat resistance than the generally known one, has an excellent transparency itself and has an excellent oligomer sealing ability.

Especially, in touch panel applications, recently, it tends to increase mounting them on communication and information equipments such as mobile phone and PDA (personal digital assistance), game machines or the like. With the market growth of these applications, it is required that they have more excellent transparency than the generally known one.

Under these circumstance, in the polyester film used in these applications, deterioration of visibility with increasing haze thereof after processing becomes an increasingly seriously problem.

As the way to solve the above problem, for example there is proposed a method of providing a hard coat layer on the polyester film for the purpose of preventing the oligomer precipitation. In this way, especially in case of applying and forming hard coat layers on both surfaces of film, the ability of preventing the oligomer precipitation is good. However, in this way, there is a problem that when winding the film as a shape of roll, the sliding property of film surface is deteriorated.

PRIOR ARTS

Patent Documents

Patent Document 1: Japanese Patent Application Laid-Open (KOKAI) No. 2007-118499
Patent Document 2: Japanese Patent Application Laid-Open (KOKAI) No. 2002-103504

SUMMARY OF TEE INVENTION

Problems to be Solved by the Invention

The present invention has been accomplished to solve the above problems. An object of the present invention is to provide a both surfaces-laminated polyester film having an easy-adhesive coating layer excellent in easy adhesion property to a hard coat layer and, another coating layer having an ability of preventing oligomer precipitation, which film is useful for constituting members of for example touch panel application.

Means for Solving Problems

As a result of the present inventors' earnest study, it has been found that the above problems can be readily solved by using a polyester film having specific coating layers. The present invention has been attained on the basis of this finding.

That is, in an aspect of the present invention, there is provided a both surfaces-laminated polyester film comprising:
a polyester film,
a first coating layer which is formed on one surface of said polyester film and comprises a polymer containing ammonium base, an acrylate polymer containing polyethylene glycol and a crosslinking agent, and
a second coating layer which is formed on another surface of said polyester film and comprises a polyurethane resin and a crosslinking agent.

Effect of the Invention

By using the both surfaces-laminated polyester film according to the present invention, it is not required to provide a hard coat layer on the film surface to be adhered to the adhesive layer for the purpose of preventing the oligomer precipitation. The both surfaces-laminated polyester film according to the present invention is useful for constituting members of for example touch panel application such that a hard coat layer having an anti-glare property is provided on the coating layer having easy adhesion property constituting the both surfaces-laminated polyester film according to the present invention. Therefore, the present invention is high in the industrial value.

PREFERRED EMBODIMENTS FOR CARRYING OUT THE INVENTION

The present invention is described in detail below.

In the present invention, the polyester film as the substrate may have single layer structure as well as multi-layer structure. Not only two or three layers structure but also four or more layers structure may be used unless out of scope of the invention and there is no limitation therefor.

The polyester used in the present invention is preferably one obtained by polycondensing an aromatic dicarboxylic acid with an aliphatic glycol, may be a polyester obtained from one aromatic dicarboxylic acid and one aliphatic glycol, and may be a copolyester copolymerizing one or more monomer component. Examples of the aromatic dicarboxylic acid include terephthalic acid and 2,6-naphthalene dicarboxylic acid. Examples of the aliphatic glycol include ethylene glycol, diethylene glycol and 1,4-cyclohexane dimethanol. Typical examples of the polyester include polyethylene terephthalate or the like. On the other hand, as the dicarboxylic acid used for copolyester monomer component, there are exemplified isophthalic acid, phthalic acid, terephthalic acid and 2,6-naphthalene dicarboxylic acid, adipic acid and sebacic acid, and as the glycol component used therefor, there are exemplified ethylene glycol, diethylene glycol, propylene glycol, butanediol, 1,4-cyclohexane dimethanol and neopentyl glycol. Further, oxycarboxylic acid such as p-oxybenzoic acid may be used.

In the both surfaces-laminated polyester film according to the present invention, a polyester whose oligomer content has been reduced may be used for the outermost layer of multi-layer structure film in order to reduce the amount of oligomer which is precipitated/crystallized on the surface of film from the film containing thereof by the heat history during the film processing. As the method for reducing the oligomer amount in the polyester, there may be used a method of solid phase polymerization In the both surfaces-laminated polyester according to the present invention, it is required to blend particles therein for the mainly purpose of imparting an easy-slip property thereto and preventing generation of scratch in each production step. The kinds of particles to be blended are not particularly limited as long as they are capable of imparting the easy-slip property to the polyester film. Specific examples of the particles include particles of silica, calcium carbonate, magnesium carbonate, barium carbonate, calcium sulfate, calcium phosphate, magnesium phosphate, kaolin, aluminum oxide, titanium oxide, etc. In addition, as the particles, there may also be used heat-resistant organic particles as described in Japanese Patent Publication (KOKOKU) No. 59-5216, Japanese Patent Application Laid-Open (KOKAI) No. 59-217755, etc. Examples of the other heat-resistant organic particles usable herein include particles of thermosetting urea resins, thermosetting phenol resins, thermosetting epoxy resins and benzoguanamine resins. As the particles, there may be further used deposited particles obtained by precipitating and finely dispersing a part of metal compounds such as a catalyst during the process for production of the polyester.

On the other hand, the shape of the particles used in the polyester layer is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The average particle diameter of the particles used in the polyester layer is usually in the range of 0.01 to 3 μm and preferably 0.01 to 2 μm. When the average particle diameter of the particles is less than 0.01 μm, the particles may tend to be aggregated together and therefore exhibit a poor dispersibility. On the other hand, when the average particle diameter of the particles is more than 3 μm the surface roughness of the obtained film tends to be too coarse, so that there tend to arise various problems when coating and forming various surface functional layers, etc., thereon in the subsequent steps.

The content of the particles in the polyester layer is usually in the range of 0.001 to 5% by weight and preferably 0.005 to 3% by weight. When the content of the particles in the polyester layer is less than 0.001% by weight, the resulting film tends to be insufficient in easy-slipping property. On the other hand, when the content of the particles in the polyester layer is more than 5% by weight, the resulting film tends to be insufficient in transparency.

The method of adding the particles into the polyester layer is not particularly limited, and any conventionally known methods can be suitably used therefor. For example, the particles may be added at any optional stages in the process for production of the polyester constituting the respective layers of the film. The particles are preferably added to the polyester after completion of an esterification reaction or a transesterification reaction thereof.

In addition, there may also be used the method of blending a slurry of the particles prepared by dispersing the particles in ethylene glycol or water with the raw polyester material using a vented kneading extruder, the method of blending the dried particles with the raw polyester material using a kneading extruder, or the like.

Meanwhile, the polyester film used in the present invention may also comprise, in addition to the above particles, known additives such as an ultraviolet absorber, an antioxidant, an antistatic agent, a thermal stabilizer, a lubricant, a dye, a pigment, etc., if required.

The thickness of the polyester film used in the present invention is not particularly limited as long as it lies within any suitable range capable of forming a film shape, and is usually in the range of 25 to 250 μm, preferably 38 to 188 μm.

Next, an example of the process of producing the polyester film used in the present invention is more specifically explained, although not particularly limited thereto. That is, in the production process, there is preferably used such a method in which the above-mentioned raw polyester material is extruded from a die in the form a of a molten sheet, and the molten sheet is cooled and solidified on a cooling roll to obtain an unstretched sheet. In this case, in order to enhance a flatness of the sheet, it is preferred to enhance adhesion between the sheet and a rotary cooling drum. For this purpose, an electrostatic adhesion method and/or a liquid coating adhesion method are preferably used. Next, the thus obtained unstretched sheet is biaxially stretched. In such a case, the unstretched sheet is first stretched in one direction thereof using a roll-type or tenter-type stretching machine. The stretching temperature is usually 70 to 120° C. and preferably 80 to 110° C., and the stretch ratio is usually 2.5 to 7 times and preferably 3.0 to 6 times. Next, the thus stretched sheet is stretched in the direction perpendicular to the stretching direction of the first stage. In this case, the stretching temperature is usually 70 to 170° C., and the stretch ratio is usually 3.0 to 7 times and preferably 3.5 to 6 times. Successively, the resulting biaxially stretched sheet is heat-treated at a temperature of 180 to 270° C. under a tension or relaxation within 30% to obtain a biaxially stretched film. Upon the above stretching steps, there may also be used the method in which the stretching in each direction is carried out in two or more stages. In such a case, the multi-stage stretching is preferably performed such that the stretch ratio in each of the two directions is finally fallen within the above-specified range.

Also, upon producing the polyester film according to the present invention, there may also be used a simultaneous biaxial stretching method. The simultaneous biaxial stretching method is such a method in which the above unstretched sheet is stretched and oriented in both of the machine and width directions at the same time while maintaining the sheet in a suitable temperature-controlled condition at a temperature of usually 70 to 120° C. and preferably 80 to 110° C. The stretch ratio used in the simultaneous biaxial stretching method is 4 to 50 times, preferably 7 to 35 times and more preferably 10 to 25 times in terms of an area ratio of the film. Successively, the obtained biaxially stretched sheet is heat-treated at a temperature of 170 to 250° C. under a tension or relaxation within 30% to obtain a stretched oriented film. As the apparatus used in the above simultaneous biaxial stretching method, there may be employed those stretching apparatuses of any conventionally known type such as a screw type stretching apparatus, a pantograph type stretching apparatus and a linear drive type stretching apparatus.

Further, a coating/stretching method (in line coating) can be used so as to treat the film surface during the stretching step of the above both surfaces-laminated polyester film. In case of providing the coating layer on the laminated polyester film by the in line coating method, a desirable film as the laminated film can be produced because the coating and stretching can be conducted simultaneously and the thickness of coating layer can be reduced depending on the stretching ratio.

Next, each coating layer constituting the both surfaces-laminated polyester film of the present invention is formed by applying the coating liquid on the film and may be provided by in line coating method which is conducted during the film production step as well as by so-called off line coating which is conducted onto the once produced film outside of film production step.

In the present invention, the first coating layer formed on the both surfaces-laminated polyester film essentially comprises the polymer containing ammonium base for the purpose of prevent the oligomer ingress into the adhesive layer.

The polymer containing ammonium base used in the present invention is one having a constituent containing an ammonium base in the polymer main chain or side chain. As concrete examples thereof, there are exemplified a polymer containing pyrrolidinium ring or quaternized alkylamine, or copolymer thereof with a monomer such as acrylic acid and methacrylic acid, a polymer of quaternized product of N-alkylamino acrylamide, a polymer of vinylbenzyl trimethyl ammonium salt, a polymer of 2-hydroxy-3-methacryloxypropyl trimethyl ammonium salt or the like. Further, these product may be used in combination and may be copolymerized with the other binder polymer. As the counter anion of quaternary ammonium base, there are exemplified an ion of halogen, alkylsulfate, alkylsulfonate, nitric acid or the like. Of these, as the counter anion, an anion other than halogen anions is preferred in view of application of the present invention because of especially good heat resistance.

In the molecular weight of polymer containing ammonium base, when the molecular weight is too low, the polymer containing ammonium base is easily removed from the coating layer so that the ability is deteriorated over time or blocking problem of coating layer may arise. Further, too low molecular weight may cause deteriorating the heat resistance. From this view point, the number average molecular weight of polymer containing ammonium base is usually not less than 1000, preferably not less than 2000, more preferably not less than 5000. On the other hand, when the number average molecular weight is too high, there may be a problem of too high viscosity of coating liquid. From this view point, the upper limit of number average molecular weight of polymer containing ammonium base is preferably about 500000. Further, these compounds may be used singly or used as a combination of two or more.

The blending amount of polymer containing ammonium base in the coating layer is preferably 20 to 70% by weight, more preferably 40 to 70% by weight. When out of the above range, it may be difficult to attain the desired oligomer sealing effect.

In the present invention, the first coating layer essentially comprises the acrylate polymer containing polyethylene glycol together with the polymer containing ammonium base so as to attain an object that a good followability upon stretching in forming the coating layer is attained by ensuring the more excellent coatability than that of the other films. As the acrylate polymer containing polyethylene glycol, there are exemplified polymers of polyethylene glycol monoacrylate, polypropylene glycol monoacrylate, polyethylene glycol diacrylate (the degree of polymerization of polyethylene glycol unit is preferably 4 to 14), polypropylene glycol diacrylate, polytetramethylene glycol diacrylate, polyethylene glycol-tetramethylene glycol) diacrylate, poly(propylene glycol tetramethylene glycol) diacrylate, polyethylene glycol-polypropylene glycol-polyethylene glycol diacrylate, polypropylene glycol-polybutylene glycol monomethacrylate, methoxypolyethylene glycol monomethacrylate, methoxypolyethylene glycol monoacrylate, octoxypolyethylene glycol-polypropylene glycol monomethacrylate, octoxypolyethylene glycol-polypropylene glycol monoacrylate, lauroxypolyethylene glycol monomethacrylate, lauroxypolyethylene glycol monoacrylate, stearoxypolyethylene glycol monomethacrylate, stearoxypolyethylene glycol monoacrylate, allyloxypolyethylene glycol monomethacrylate, allyloxypolyethylene glycol monoacrylate, or the like as the starting material.

The number average molecular weight of acrylate polymer containing polyethylene glycol is usually not less than 1000, preferably not less than 2000, more preferably not less than 5000. On the other hand, when the number average molecular weight is too high, there may be a problem of too high viscosity of coating liquid. From this view point, the upper limit of number average molecular weight of polymer containing ammonium base is preferably about 500000. Further, these compounds may be used singly or used as a combination of two or more.

The alkyl chain length of alkylacrylate polymer containing polyethylene glycol is not specifically limited as long as it is generally within the polymerizable range as a polymer. The content of alkylacrylate polymer containing polyethylene glycol constituting the coating layer according to the present invention is preferably 5 to 40% by weight so as to attain the good followability upon stretching. When out of the above range, there may be a problem that the followability upon stretching in forming the coating layer is insufficient.

In the present invention, the polymer containing ammonium base and the acrylate polymer containing polyethylene glycol may be used as a form of mixture or as a form of product previously copolymerized therewith, and is not specifically limited as long as not affecting the scope of present invention adversely. When copolymerizing, generally known production methods can be used.

In both coating layers of both surfaces-laminated polyester film according to the present invention, a crosslinking agent is essentially used in combination for the purpose of further improvement of durability of the coating layers. As a concrete crosslinking agent, there are exemplified methylolated or alkylolated urea, melamine, guanamine, oxazoline, epoxy compounds, acrylamide, polyamide compounds, epoxy compounds, aziridine compounds, isocyanate compounds, titanium coupling agents, zirconium-aluminum coupling agents, polycarbodiimide or the like.

In the above crosslinking agents, melamine crosslinking agent is preferable in view of excellent coatability and adhesive durability especially in the use of present invention. As the melamine crosslinking agent, there may be used melamine, methylolated melamine derivative obtained from condensation of melamine with formaldehyde, partial or complete etherified compounds obtained by reacting methylolated melamine with a lower alcohol and mixture thereof. Of these, the methylolated melamine derivative obtained from condensation of melamine with formaldehyde is preferable, and as one example of commercial product thereof, "BECXAMINE MA-S" manufactured by DIC Corporation is exemplified.

Further, the melamine crosslinking agent may be a Monomer product or condensed product comprising dimer or more polymerized product, and mixture thereof may be used. As the lower alcohol used for the above etherification, there are preferably used methyl alcohol, ethyl alcohol, isopropyl alcohol, n-butanol, isobutanol or the like. As the functional group, there are exemplified an imino group, methylol group, and a group having alkoxymethyl group such as methoxymethyl group and butoxymethyl group in one molecule, that is, an imino group-type methylated melamine, methylol group-type melamine, methylol group-type methylated melamine, complete alkylated-type methylated melamine or the like. Of these, methylolated melamine is especially preferred. Further, for the purpose of accelerating the thermal curing of melamine crosslinking agent, for example, an acidic catalyst such as p-toluenesulfonic acid may be used in combination.

The oxazoline crosslinking agent in the present invention is a compound having oxazoline rings in the molecule and includes a monomer having an oxazoline ring and a polymer synthesized from an oxazoline compound as one of monomer. Especially, a polymer having oxazoline groups at the side chain is preferred and such polymer can be easily obtained by polymerizing an addition polymerizable monomer having an oxazoline group with the other monomer. As commercial products of oxazoline compound using acrylic-based monomer as the other monomer, there are exemplified "EPOCROS WS-500" and "EPOCROS WS-300" (manufactured by Nippon Shokubai Co., Ltd.) which are polymer type crosslinking agents where oxazoline groups are branched with an acrylic-based resin.

The isocyanate compound in the present invention means a compound having isocyanate groups in the molecule. Concretely, there are exemplified hexamethylene diisocyanate, trimethylhexamethylene diisocyanate, cyclohexylene diisocyanate, xylylene diisocyanate, isophorone diisocyanate, naphthalene diisocyanate, tolylene diisocyanate, polymers thereof, derivatives thereof or the like.

As the epoxy compound in the present invention, there are exemplified a compound having epoxy groups, a prepolymer thereof and a cured product thereof. A typical example thereof is a condensation product of epichlorohydrin and bisphenol A. Especially, a reaction product of a low molecular weight polyol and epichlorohydrin provides an epoxy resin excellent in water solubility.

These crosslinking agents may be used singly or used in combination of plural types. Further, in view of applying to in line coating method, it is preferred that the crosslinking agent has water solubility and water dispersibility.

In each coating layer constituting the both surfaces-laminated polyester film in the present invention, a binder polymer may be used in combination unless the subject matter of the present invention is adversely affected thereby.

The "binder polymer" used in the present invention is defined as a high-molecular compound having a number-average molecular weight (Mn) of not less than 1000 as measured by gel permeation chromatography (GPC) according to a flow scheme for evaluation of safety of high-molecular compounds (Council of Chemical Substances; November, 1985), and exhibiting a good film-forming property.

Specific examples of the binder polymer include polyester resins, acrylic resins, polyvinyl resins (such as polyvinyl alcohol, polyvinyl chloride and vinyl chloride-vinyl acetate copolymers), polyurethane resins, polyalkylene glycols, polyalkylene imines, methyl cellulose, hydroxy cellulose, starches, etc.

The second coating layer of the film according to the present invention essentially comprises a polyurethane resin and a crosslinking agent for the purpose of improvement of adhesive property to the hard coat layer. The polyurethane resin in the present invention is a polymer compound having a urethane bond in the molecule. In such polymer compounds, water dispersible or water soluble urethane resin is preferred in view of applicability to the in line coating. In order to provide the water dispersible or water soluble to an urethane resin, it is possible to introduce a hydrophilic group such as a hydroxyl group, carboxyl group, sulfone acid group, sulfonyl group, phosphoric acid group and ether group. Of these hydrophilic group, carboxylic acid group and sulfone acid group are preferably used in view of improvement of coating property and adhesive property.

As the concrete production process of urethane resin, there is exemplified a method using a reaction between a hydroxyl group and isocyanate group. As the hydroxyl group used as the starting material, a polyol is preferably used and concrete examples thereof include polyether polyols, polyester polyols, polycarbonate polyols, polyolefin polyols and acryl polyols. These may be used singly or plurality.

As the polyether polyols, there are exemplified polyethylene glycol, polypropylene glycol, polyethylene propylene glycol, polytetramethylene ether glycol and polyhexamethylene ether glycol.

As the polyester polyols, there are exemplified a reaction product of a polycarboxylic acid or anhydride thereof and a polyol. Examples of the polycarboxylic acid or anhydride include malonic acid, succinic acid, glutaric acid, adipic acid, pimelic acid, suberic acid, sebacic acid, fumaric acid, maleic acid, terephthalic acid, isophthalic acid and anhydrides thereof. Examples of the polyols include ethylene glycol, diethylene glycol, triethylene glycol, propylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol 1,9-nonanediol, 2-methyl-1,8-octanediol, butyl-2-hexyl-1,3-propanediol, cyclohexanediol, bis-hydroxymethyl cyclohexane, dimethanol benzene, bis-hydroxyethoxy benzene, alkyldialkanol amine and lactonediol.

As the polycarbonate polyols, there are exemplified polycarbonate polyols obtained from dealcoholizing reaction of a polyol with dimethyl carbonate, diethyl carbonate, diphenyl carbonate and ethylene carbonate, such as poly(1,6-hexylene) carbonate and poly(3-methyl-1,5-pentylene) carbonate.

As the polyisocyanate compound to obtain the urethane resin, there are exemplified aromatic diisocyanates such as tolylene disocyanate, xylylene disocyanate, methylenediphenyl disocyanate, phenylene disocyanate, naphthalene disocyanate and tolidine disocyanate; aliphatic disocyanates having an aromatic ring such as α,α,α'α'-tetramethylxylylene disocyanate; aliphatic disocyanates such as methylene disocyanate, propylene disocyanate, lysine disocyanate, trimethylhexamethylene disocyanate and hexamethylene disocyanate; alicyclic disocyanates such as cyclohexane disocyanate, methylcyclohexane disocyanate, isophorone disocyanate, dicyclohexylmethane disocyanate and isopropylidene disocyanate. These may be used singly or plurality in combination.

When synthesizing the urethane resin, a known chain extender may be used. As the chain extender, there is no limitation as long as having two or more reactive groups to the isocyanate group and a chain extender having two or more hydroxyl groups or amino groups are versatilely used.

As the chain extender having two or more hydroxyl groups, there are exemplified glycols, concretely aliphatic glycols such as ethylene glycol, propylene glycol and butanediol, aromatic glycols such as xylylene glycol and bis-hydroxyethoxy benzene, ester glycols such as neopentyl glycol hydroxypivalate. As the chain extender having two or more amino groups, there are exemplified aromatic diamines such as tolylene diamine, xylylene diamine and diphenylmethane diamine, aliphtatic diamines such as ethylene diamine, propylene diamine, hexane diamine, 2,2-dimethyl-1,3-propane diamine, 2-methyl-1,5-pentane diamine, trimethylhexane diamine, 2-butyl-2-ethyl-1,5-pentane diamine, 1,8-octane diamine, 1,9-nonane diamine and 1,10-decane diamine, alicyclic diamines such as 1-amino-3-aminomethyl-3,5,5-trimethyl cyclohexane, dicyclohexylmethane diamine, isopropylpylidene cyclohexyl-4,4'-diamine, 1,4-diamiocyclohexane and 1,3-bis-aminomethyl cyclohexane.

The blending amount of polyurethane resin in the second coating layer is usually 10 to 80, preferably 20 to 60%. When the blending amount is less than 10%, there may be a possibility that the adhesion to the surface functional layer such as the hard coat layer is reduced. On the other hand, when the blending amount is more than 80%, there may be a problem that the visibility after laminating the surface functional layer is deteriorated by reducing the refractive index of coating layer.

Further, for the purpose of improving the refractive index of coating layer itself, an aromatic compound may be contained in the urethane resin. The content of urethane resin based on the weight ratio to the overall weight of coating layers is usually 10 to 80%, preferably 10 to 70%. When the blending amount is less than 10%, there may be a possibility that the adhesion to the surface functional layer such as the hard coat layer is reduced. On the other hand, when the blending amount is more than 80%, there may be a problem that the visibility after laminating the surface functional layer is deteriorated by reducing the refractive index of coating layer.

In the present invention, the coating layer comprising the crosslinking agent and the polyurethane resin as the essential components in the present invention may contain a polyester resin for the purpose of improvement of adhesion property to the hard coat layer. The polyester in the present invention is defined as a linear polyester whose constituting components are a dicarboxylic acid component and a glycol component. As the dicarboxylic acid component, there are exemplified terephthalic acid, isophthalic acid, phthalic acid, 2,6-naphthalene dicarboxylic acid, 4,4-diphenyl dicarboxylic acid, 1,4-cyclohexane dicarboxylic acid, adipic acid, sebacic acid, phenylindane dicarboxylic acid, dimer acid or the like. Two or more these dicarboxylic acids may be used in combination. Further, in addition to these, there may be used an unsaturated polybasic acids such as dicarboxylic acids, maleic acid, fumaric acid and itaconic acid, and a hydroxycarboxylic acids such as p-hydroxybenzoic acid and p-(β-hydroxyethoxy) benzoic acid in a small amount. The amount of unsaturated polybasic acid and hydroxycarboxylic acid used is 10 mol % or less, preferably not more than 5 mol %.

As the glycol component, there are exemplified ethylene glycol, 1,4-butanediol, neopentyl glycol, diethylene glycol, dipropylene glycol, 1,6-hexanediol, 1,4-cyclohexane dimethanol, xylylene glycol, dimethylol propionic acid, glycerin, trimethylol propane, poly(ethyleneoxy) glycol, poly(tetramethyleneoxy) glycol, alkyleneoxide adduct of bisphenol A, alkyleneoxide adduct of hydrogenated bisphenol A or the like. Two or more these glycols may be used in combination.

Of these polyol components, ethylene glycol, ethyleneoxide or propyleneoxide adduct of bisphenol A, and 1,4-butanediol are preferred, especially, ethylene glycol and ethyleneoxide or propyleneoxide adduct of bisphenol A are more preferred. It is possible and preferred for the above polyester resin to copolymerize a compound having sulfonate group or carboxylate group in a small amount for the purpose of facilitating the water solubility thereof. As the compound having sulfonate group, there are preferably exemplified alkali metal salts of sulfonic acid or amine salts of sulfonic acid such as sodium 5-sulfoisophthalate, ammonium 5-sulfoisophthalate, sodium 4-sulfoisophthalate, methylammonium 4-sulfoisophthalate, sodium 2-sulfoisophthalate, potassium 5-sulfoisophthalate, potassium 4-sulfoisophthalate, potassium 2-sulfoisophthalate and sodium sulfosuccinate.

As the compound having carboxylate group, there are preferably exemplified trimellitic acid anhydride, trimellitic acid, pyromellitic acid anhydride, pyromellitic acid, trimesic acid, cyclobutane tetracarboxylic acid, dimethylol propionic acid and monoalkali metal salts thereof. The free carboxyl group is converted to carboxylate group by reacting the free carboxyl group with an alkali metal compound or amine compound after the copolymerization. There may be used a polyester synthesized by selecting one or more compounds from the above mentioned compounds and conducting a general condensation reaction.

Further, for the purpose of ensuring the durability and good coatability, it is preferred to contain an acrylic resin therein. The acrylic resin used in the present invention is a polymer obtained from a polymerizable monomer having a carbon-carbon double bond represented by acrylic and methacrylic monomers. These may be a homopolymer or may be a copolymer. Further, these may include copolymers of the other polymers (for example, polyesters, polyurethanes or the like). For example, block copolymers and graft copolymers are included therein. Still further, these may include a polymer (case by case, a polymer mixture) obtained by polymerizing a polymerizable monomer having a carbon-carbon double bond in a polyester solution or polyester dispersion. Similarly, these may include a polymer (case by case, a polymer mixture) obtained by polymerizing a polymerizable monomer having a carbon-carbon double bond in the other polymer solution or dispersion.

As the polymerizable monomer having a carbon-carbon double bond, there is no limitation and as the typical compounds, there are exemplified various monomers having carboxyl group(s) and salts thereof such as acrylic acid, methacrylic acid, crotonic acid, itaconic acid, fumaric acid, maleic acid and citraconic acid; various monomers having hydroxyl group such as 2-hydroxyethyl (meth)acrylate, 2-hydroxypropyl (meth)acrylate, 2-hydroxybutyl (meth)acrylate, monobutylhydroxyl fumarate and monobutylhydroxyl itaconate; various (meth)acrylates such as methyl(meth)acrylate, ethyl (meth)acrylate, propyl(meth)acrylate, butyl(meth)acrylate and lauryl(meth)acrylate; and various nitrogen-containing vinyl-based monomers such as (meth)acrylamide, diacetone acrylamide, N-methylol acrylamide and (meth)acrylonitrile. Further, the following polymerizable monomers may be copolymerized together with the above mentioned monomers. As the copolymerizable monomers, there are exemplified various styrene derivatives such as styrene, α-methylstyrene, divinylbenzene and vinyltoluene; various vinyl esters such as vinyl acetate and vinyl propionate; polymerizable silicon-containing monomers such as γ-methacryloxy propyltrimethoxy silane, vinyl trimethoxy silane and methacryloyl silicone macromer; phosphorus-containing vinyl monomers; various halogenated vinyl monomers such as vinyl chloride, vinylidene chloride, vinyl fluoride, vinylidene fluoride, trifluorochloroethylene, tetrafluoroethylene, chlorotrifluoroethylene and hexafluoropropylene; and various conjugated dienes.

Further, in case where the hard coat layer is provided on the second coating layer essentially comprising the crosslinking agent and polyurethane resin, it is possible to contain an aromatic ring compound, preferably a polycyclic compound such as a compound having a naphthalene skeleton and a compound having a fluorene skeleton in the second coating layer for the purpose of improving the refractive index of second coating layer itself.

As a concrete method for introducing the compound having a naphthalene skeleton in the coating layer, there is exemplified a method using a binder polymer where the naphthalene skeleton has been introduced. Of the binder polymers, a polyester resin is preferably used so that the more naphthalene skeletons can be introduced. As a method for incorporating the compound having naphthalene skeleton into the polyester resin, there are exemplified a method introducing two or more hydroxyl groups as a substituent into a naphthalene ring to obtain a diol component or polyhydroxyl component or a method introducing two or more carboxylic acid groups as a substituent into a naphthalene ring to obtain a dicarboxylic acid component or polycarboxylic acid component. As the typical compound having the naphthalene skeleton, there are exemplified 1,5-naphthalene dicarboxylic acid, 2,6-naphthalene dicarboxylic acid and 2,7-naphthalene dicarboxylic acid.

As a concrete method for introducing the compound having a fluorene skeleton in the coating layer, there is exemplified a method using a binder polymer where the fluorene skeleton has been introduced. Of the binder polymers, a polyester resin is preferably used in view of good adhesion to the substrate. As a method for incorporating the compound having fluorene skeleton into the polyester resin, there is exemplified a method containing 9,9-bis(3-methyl-4-hydroxyphenyl)fluorene (for example, described in Japanese Patent Application Laid-Open (KOKAI) No. 2009-126042).

The blending amount of crosslinking agent into each coating layer constituting the both surfaces-laminated polyester film is usually 1 to 50% by weight, preferably 5 to 30% by weight. When the blending amount is out of the above range, there may be a possibility of insufficient adhesion durability in each coating layer.

Also, in order to improve an anti-blocking property and a slipping property of each coating layer, the coating layer preferably comprises particles. Examples of the particles include silica, alumina, kaolin, calcium carbonate, titanium oxide, barium salts and the like.

The blending amount of particles in the coating layer is usually 0.5 to 10% by weight, preferably 1 to 5% by weight. When the blending amount is less than 0.5% by weight, the anti-blocking property may be insufficient. When the blending amount is more than 10% by weight, the transparency of film may be deteriorated.

Further, each coating layer may also comprise various additives such as a defoaming agent, a coatability improver, a thickening agent, an organic lubricant, organic polymer particles, an antioxidant, an ultraviolet absorber, a foaming agent and a dye, if required, unless the subject matter of the present invention is adversely affected thereby.

When forming the coating layer by a coating-stretching method (in-line coating), the both surfaces-laminated polyester film is preferably produced by the method in which an aqueous solution or a water dispersion comprising a series of the above mentioned compounds is prepared as a coating solution having a concentration of about 0.1 to about 50% by weight in terms of a solid content thereof, and the thus prepared coating solution is applied onto the polyester film.

The coating solution may also comprise a small amount of an organic solvent for the purpose of improving a dispersibility in water, a film-forming property, etc. unless the subject matter of the present invention is adversely affected thereby. As the organic solvent, there are exemplified aliphatic or alicyclic alcohols such as n-butyl alcohol, n-propyl alcohol, isopropyl alcohol, ethyl alcohol and methyl alcohol, glycols such as propylene glycol, ethylene glycol and diethylene glycol, glycol derivatives such as n-butyl cellosolve, ethyl cellosolve, methyl cellosolve and propylene glycol monomethyl ether, ethers such as dioxane and tetrahydrofuran, esters such as ethyl acetate and amyl acetate, ketones such as methyl ethyl ketone and acetone, amides such as N-methylpyrolidone. The organic solvents may be used alone, or may be appropriately used in the form of a mixture of any two or more thereof.

The coating amount (after drying) of coating layer comprising the polymer containing ammonium base, the acrylate polymer containing polyethylene glycol and a crosslinking agent as the essential components in the present invention is usually in the range of 0.005 to 1 $g/m^2$, preferably 0.005 to 0.5 $g/m^2$ and more preferably 0.005 to 0.1 $g/m^2$. When the coating amount is less than 0.005 $g/m^2$, the thickness of coating layer may be insufficient in the uniformity thereof so that the oligomer amount precipitated from the coating layer surface after heat treatment may be increased. On the other hand, when coating in the amount of more than 1 $g/m^2$, there may be problems such as deteriorating the slipping property.

Further, the coating amount (after drying) of coating layer comprising the polyurethane resin and the crosslinking agent as the essential components in the present invention is usually in the range of 0.01 to 1 g/m², preferably 0.02 to 0.5 g/m² and more preferably 0.02 to 0.1 g/m². When the coating amount is less than 0.01 g/m², the thickness of coating layer may be insufficient in the uniformity thereof so that the adhesion property to the hard coat layer may be insufficient. On the other hand, when coating in the amount of more than 1 g/m², there may be problems such as deteriorating the slipping property.

In the present invention, as the method of forming the respective coating layers on the polyester film, there may be used conventionally known coating methods such as a reverse gravure coating method, a direct gravure coating method, a roll coating method, a die coating method, a bar coating method, a curtain coating method and a spray coating method which are described, for example, in Yuji HARAZAXI, "Coating Methods", Maki-shoten, 1979.

The polyester film constituting the both surfaces-laminated film in the present invention may be previously subjected to surface treatments such as corona treatment and plasma treatment.

To the both surfaces-laminated film in the present invention, there may be a case to require a high transparency even after the film is subjected to a condition at high temperature for long time such as 180° C. for two hours as for example, a touch panel application. From this view point, in order to be capable of applying the film to the touch panel member, it is preferable that the film haze change (ΔH) before and after the heat treatment (150° C. three hours) of both surfaces-laminated film having the hard coat layer after providing the hard coat layer on the coating layer, is not more than 0.5%, preferably not more than 0.3%, especially preferably not more than 0.1%. When ΔH is more than 0.5%, the visibility is reduced with increasing the haze so that it may be unsuitable to use it as the application requiring the high transparency such as the touch panel application.

The amount of oligomer (cyclic trimer) (OL) extracted with dimethylformamide from the surface (one surface) of coating layer essentially comprising the polymer containing ammonium base, the acrylate polymer containing polyethylene glycol and the crosslinking agent before and after the heat treatment (150° C. three hours), is usually not more than 1.0 mg/m², preferably not more than 0.8 mg/m². When the OL is more than 1.0 mg/m², the amount of oligomer precipitation is increased in the heat treatment under the condition at high temperature for long time such as 180° C. for two hours so that the transparency of film may be deteriorated.

EXAMPLES

The present invention is described in more detail below by Examples. However, these Examples are only illustrative and not intended to limit the present invention thereto, and they are involved in the scope of the present invention unless the subject matters depart therefrom. Measurement methods and evaluation methods used in the present invention are set forth below.

(1) Measurement of Intrinsic Viscosity of Polyester:

One gram of a polyester was accurately weighed, and mixed with and dissolved in 100 mL of a mixed solvent comprising phenol and tetrachloroethane at a weight ratio of 50:50, and a viscosity of the resulting solution was measured at 30° C.

(2) Measurement of Average Particle Size (d50:μm):

Using a centrifugal precipitation type particle size distribution measuring apparatus ("SA-CP3 Model" manufactured by Shimadzu Seisakusho Corp.), the particle size corresponding to a cumulative (based on weight) of 50% in equivalent spherical distribution of the particles was measured as an average particle size.

(3) Measurement of Oligomer Amount (OL) Extracted from the Surface of Coating Layer:

The test film was previously heated in air at 150° C. for 3 hours. Thereafter, this heat-treated film was set to the inner surface of box as close as possible, where the upper side of box was open and the box size was 10 cm square and 3 cm high, so as to form a box shape film. Next, 4 ml of DMF (dimethylformamide) was poured into the box type film obtained from the above so as to contact the DMF with the surface of coating layer. After 3 minutes leaving thereof, the DMF was recovered. The recovered DMF was injected to a liquid chromatography ("LC-7" manufactured by Shimadzu Corporation) to determine the oligomer amount in the DMF. The value of the above oligomer amount was divided by the area of film contacted with the DMF to obtain the oligomer amount of surface (mg/m²). The oligomer amount in the DMF was determined by the peak area ratio of standard sample peak area and measured sample peak area (absolute calibration method). As to the opposite surface of film, the measurement was conducted by the same procedure to the above method to determine the oligomer amount of surface.

The above standard sample was prepared by precisely weighing the previously divided oligomer (cyclic trimer) and dissolving the oligomer into a precisely weighed DMF. The concentration of standard sample is preferably 0.001 to 0.01 mg/ml.

The measurement conditions of liquid chromatograph are set forth below.

Mobile phase A: Acetonitrile
Mobile phase B: 2% aqueous acetic acid solution
Column: "MCIGELODS1HU" manufactured by Mitsubishi Chemical Corporation
Column temperature: 40° C.
Flow rate: 1 ml/min
Detective wavelength: 254 nm (4) Film Haze (HO):

The haze of the test film having the hard coat layer and obtained by the following method of term (6) (before heat-treatment) was measured using a haze measuring device "HAZE METER HM-150" manufactured by Murakami Color Research Laboratory Co., Ltd., according to JIS K7136.

(5) Film Haze after Heat-Treatment (H1):

The test film having the hard coat layer and obtained by the following method of term (6) was heat-treated under prescribed conditions (at 150° C. for 3 hours) and thereafter the haze of the test film was measured according to the same method to the above term (4).

(6) Evaluation of Initial Adhesion Property to the Hard Coat Layer (Surrogate Evaluation of Practical Property):

On the coating layer (the coating layer essentially comprising the crosslinking agent and polyurethane) of sample film, a hard coat layer material comprising the following compositions was applied so that the coating thickness after drying was adjusted to 5 μm, and heat-treated at 100° C. for 15 seconds. Thereafter, by using a high-pressure mercury vapor lamp having an irradiation power of 120 W/cm, the irradiation was conducted under such condition that the high-pressure mercury vapor lamp was set above 10 cm of the coating layer surface position and irradiation speed was 10 m/min, to form a hard coat layer. Next, to the obtained hard coat layer, cross cuttings of 100 grids per one inch width was formed and Cellotape (Registered Trade Mark) was adhered thereon by using a metal roll (2 kg). The rapid delamination test of obtained sample film at 180° C. delamination angle was conducted and evaluated by the following rating.
<Composition of Hard Coat Layer>

| | |
|---|---|
| KAYARAD DPHA (manufacture by Nippon Kayaku Co., Ltd.) | 77 parts |
| KAYARAD R-128H (manufacture by Nippon Kayaku Co., Ltd.) | 18 parts |
| IRGACURE651 (manufactured by Ciba-Geigy Co., Ltd.) | 5 parts |

<Rating>

◎ Delaminated grid number: 0 (practically no problem level).

○: 1≤ Delaminated grid number≤10 (practically no problem level).

Δ: 11≤Delaminated grid number≤20 (practically few problem level).

x: 21<Delaminated grid number (practically problem level).

(7) Measurement of Dynamically Friction Coefficient (F) of Both Surfaces-Laminated Polyester Film:

The sample film was previously cut in parallel of machine direction to obtain cut films having a size of 18 mm×120 mm. Next, two cut films were overlapped each other so that the front side coating surface of one film was overlapped to the back side coating surface of another film. To the overlapped films, under load of 30 g/cm², the dynamically friction coefficient (F) was measured at the point where the under side film was moved for 2 cm from the measurement starting point, and evaluated by the following rating.

<Rating>

○: 0.20≤F≤0.65 (practically no problem level).

x: 0.20>F or F>0.65 (practically problem level).

(8) Surrogate Evaluation of Visibility of Both Surfaces-Laminated Polyester Film (Surrogate Evaluation of Practical Property):

The transparency/visibility of sample film were evaluated by the following rating.

<Rating>

◎: The film haze after the heat-treatment (H1) is less than 0.9% and the transparency/visibility are especially good (practically no problem level).

○): The film haze after the heat-treatment (H1) is not less than 0.9% and less than 1.2%, and the transparency/visibility are good (practically no problem level).

x: The film haze after the heat-treatment (H1) is not less than 1.2% and the transparency/visibility are not good (practically problem level).

(9) Durability Evaluation of Both Surfaces-Laminated Polyester Film (Surrogate Evaluation of Practical Property):

An adhesive tape (No. 31B tape manufactured by Nitto Denko Corporation) was previously adhered onto each coating layer surface of the sample film and this sample film was leaved in a constant temperature and humidity chamber at 60° C. under 90% RH for 24 hours. Next, after taking out the sample film, immediately the adhesive tape was released and the surface condition of each coating layer was evaluated by the following rating.

<Rating>

○): In the releasing trace portion of adhesive tape, the coating layer is still remained (practically no problem level).

x: In the releasing trace portion of adhesive tape, the coating layer is not remained or even though remained, the remained coating layer is too few to exert the intrinsic performance of coating layer (practically problem level).

The polyesters used in Examples and Comparative Examples were prepared by the following manners.

<Production Method of Polyester (I)>

100 parts by weight of dimethylterephthalate and 60 parts by weight of ethylene glycol as starting materials and 0.09 parts by weight of magnesium acetate tetrahydrate as a catalyst were added into a reactor, the reaction was initiated at 150° C., the reaction temperature was gradually increased together with removing methanol and after 3 hours, the temperature reached 230° C. After 4 hours, ester exchange reaction was substantially finished. Into thus reaction mixture, 0.04 parts of ethyl acid phosphate was added and further 0.04 parts of antimony trioxide was added, and the polycondensation reaction was conducted for 4 hours. Namely, the reaction temperature was gradually increased from 230° C. to 280° C. On the other hand the pressure was gradually reduced from the ordinary pressure to finally 0.3 mmHg. After starting the reaction, the stirring driving force in the reactor was changed. When the intrinsic viscosity reached to 0.63, the reaction was stopped and the produced polymer was discharged under nitrogen pressurized condition. The intrinsic viscosity of obtained polyester (I) was 0.63.

<Production Method of Polyester (II)>

The same procedure as defined in the Production method of polyester (I) was conducted except that after adding 0.04 parts of ethyl acid phosphate, 0.1 parts of silica particles having an average particle size of 1.6 μm which were dispersed in ethylene glycol and 0.04 parts of antimony trioxide were added and the polycondensation reaction was stopped at the stage that the intrinsic viscosity became 0.65, to produce a polyester (II). The intrinsic viscosity of obtained polyester (II) was 0.65.

Example 1

A mixture material prepared by mixing 90% of polyester (II) and 10% of polyester (I) as the material of outermost layer (surface layer) and the polyester (I) as the material of intermediate layer were provided to two extruders, respectively, melted at 285° C. respectively, co-extruded onto a quenching roll whose temperatures was controlled at 40° C. as a layer structure of two types/two layers (surface layer/intermediate layer/surface layer), and quenched and solidified thereof to prepare a non-stretched sheet. Next, the sheet was stretched in machine direction 3.4 times at 85° C. by use of differential speed of rolls. After stretching in machine direction, respective coating liquids comprising the following compositions were applied on the both surfaces (upper side surface is named as "A surface" and under side surface is named "B surface" based on the film running direction), so that the respective coating amounts (after drying) become the prescribed amounts, respectively. After applying, the applied film was introduced to a tenter machine, stretched in transverse direction 4.3 times at 120° C., heat-treated at 225° C., and relaxed in transverse direction to obtain a both surfaces-laminated polyester film having coating layers and having a thickness of 188 μm (each surface layer: 15 μm and intermediate layer: 158 μm). The properties of obtained both surfaces-laminated polyester film are shown in the following Table 3. The used compounds for constituting the coating layers are set forth below.

(Used Compounds)

Polymer containing ammonium base (A1): polymer of 2-hydroxy-3-methacryloxypropyl trimethyl ammonium salt, counter ion: methyl sulfonate, number average molecular weight: 30000

Acrylate polymer containing polyethylene glycol (B1): mono acrylate polymer containing polyethylene glycol, number average molecular weight: 20000

Acrylate polymer containing polyethylene glycol (B2): octoxypolyethylene glycol-polypropylene glycol mono acrylate polymer, number average molecular weight: 32000

Crosslinking agent (C1): melamine-type crosslinking agent ("BECKAMINE MA-S" manufactured by DIC Corporation)

Crosslinking agent (C2): oxazoline-type crosslinking agent ("EPOCROS WS-500" (manufactured by Nippon Shokubai Co., Ltd.)

Particles (D1): alumina surface-modified colloidal silica (average particle size: 50 μm)

Particles (D2): colloidal silica (average particle size: 70 nm)

Binder (E1): polyvinylalcohol (saponification degree: 88 Mol %, polymerization degree: 500)

Binder (E2): polyurethane resin produced by the following method.

A polyester polyol comprising 664 parts of telephthalic acid, 631 parts of isophthalic acid, 472 parts of 1,4-butanediol and 447 parts of neopentyl glycol was obtained. Next, 321 parts of adipic acid and 268 parts of dimethylol propionic acid were added to the obtained polyester polyol, to obtain a polyester polyol A having pendant carboxyl groups. Further, 160 parts of hexamethylene diisocyanate was added to 1880 parts of the above polyester polyol, to obtain aqueous coating material of polyurethane resin.

Binder (E3): acrylic resin ("RX-702" manufactured by Nippon Carbide Industries Co., Inc.)

Binder (E4): aqueous dispersion of polyester resin copolymerized with the following composition.

Monomer composition: (acid components) 2,6-naphthalene dicarboxylic acid/isophthalic acid/5-sodium sulfoisophthalic acid//(diol components) ethylene glycol/diethylene glycol=84/13/31/80/20 (mol %)

Binder (E5): polyester resin, Tg=63° C.

Acid, components: 50 mol % of terephthalic acid, 48 mol % of isophthalic acid and 2 mol % of 5-sodium sulfoisophthalic acid Diol components: 50 mol % of ethylene glycol and 50 mol % of neopentyl glycol

Examples 2 to 8

The same procedure as defined in Example 1 was conducted except that the compositions of coating materials for coating the A surface and B surface were changed as shown in the following Tables 1 and 2 (unit in tables are % by weight) to produce a both surfaces-laminated polyester film. The properties of obtained both surfaces-laminated polyester films are shown in the following Table 3.

Comparative Example 1

The same procedure as defined in Example 1 was conducted except that no coating layer was provided to produce a polyester film. The properties of obtained polyester films are shown in the following Table 4.

Comparative Examples 2 to 7

The same procedure as defined in Example 1 was conducted except that the composition of each coating layer was changed as shown in the following Tables 1 and 2 to produce a both surfaces-laminated polyester film. The properties of obtained both surfaces-laminated polyester films are shown in the following Table 4.

TABLE 1

|  | A1 | B1 | B2 | C1 | D1 | E1 |
|---|---|---|---|---|---|---|
| Coating liquid 1 | 60 | 20 | 0 | 10 | 10 | 0 |
| Coating liquid 2 | 60 | 0 | 20 | 10 | 10 | 0 |
| Coating liquid 3 | 30 | 20 | 0 | 40 | 10 | 0 |
| Coating liquid 4 | 10 | 60 | 0 | 20 | 10 | 0 |
| Coating liquid 5 | 10 | 0 | 60 | 20 | 10 | 0 |
| Coating liquid 6 | 30 | 0 | 0 | 30 | 10 | 30 |
| Coating liquid 7 | 0 | 70 | 0 | 20 | 10 | 0 |
| Coating liquid 8 | 30 | 60 | 0 | 0 | 10 | 0 |

TABLE 2

|  | C1 | C2 | D2 | E2 | E3 | E4 | E5 |
|---|---|---|---|---|---|---|---|
| Coating liquid 9 | 20 | 0 | 10 | 20 | 30 | 20 | 0 |
| Coating liquid 10 | 0 | 20 | 10 | 20 | 30 | 0 | 20 |
| Coating liquid 11 | 20 | 0 | 10 | 30 | 40 | 0 | 0 |
| Coating liquid 12 | 20 | 0 | 10 | 30 | 0 | 0 | 40 |
| Coating liquid 13 | 0 | 20 | 10 | 0 | 0 | 70 | 0 |
| Coating liquid 14 | 0 | 20 | 10 | 0 | 70 | 0 | 0 |

TABLE 3

|  | Coating liquid A surface/ B surface | Coating amount (after drying) (g/m$^2$) A surface/ B surface | Haze change after heating ΔH (H1 − H0) (%) | OL (mg/m$^2$) A surface |
|---|---|---|---|---|
| Example 1 | 1/9 | 0.012/0.035 | 0.1 (0.7 − 0.6) | 0.7 |
| Example 2 | 2/9 | 0.012/0.035 | 0.2 (0.8 − 0.6) | 0.8 |
| Example 3 | 3/9 | 0.012/0.035 | 0.2 (0.8 − 0.6) | 0.9 |
| Example 4 | 4/9 | 0.012/0.035 | 0.5 (1.1 − 0.6) | 1.5 |
| Example 5 | 5/9 | 0.012/0.035 | 0.5 (1.1 − 0.6) | 1.6 |
| Example 6 | 1/10 | 0.012/0.035 | 0.1 (0.7 − 0.6) | 0.8 |
| Example 7 | 1/11 | 0.012/0.035 | 0.1 (0.7 − 0.6) | 0.8 |
| Example 8 | 1/12 | 0.012/0.35 | 0.1 (0.7 − 0.6) | 0.8 |

|  | Dynamic friction coefficient (F) | Adhesion property to the hard coat layer | Visibility | Durability A surface/ B surface |
|---|---|---|---|---|
| Example 1 | ◯ (0.57) | ◉ | ◉ | ◯/◯ |
| Example 2 | ◯ (0.58) | ◉ | ◉ | ◯/◯ |
| Example 3 | ◯ (0.59) | ◉ | ◉ | ◯/◯ |
| Example 4 | ◯ (0.59) | ◉ | ◯ | ◯/◯ |
| Example 5 | ◯ (0.56) | ◉ | ◯ | ◯/◯ |
| Example 6 | ◯ (0.56) | ◉ | ◉ | ◯/◯ |
| Example 7 | ◯ (0.56) | ◯ | ◉ | ◯/◯ |
| Example 8 | ◯ (0.56) | ◯ | ◉ | ◯/◯ |

TABLE 4

| | Coating liquid A surface/ B surface | Coating amount (after drying) (g/m²) A surface/ B surface | Haze change after heating ΔH (H1 − H0) (%) | OL (mg/m²) A surface |
|---|---|---|---|---|
| Comparative Example 1 | — | — | 1.9 (2.6 − 0.6) | 14 |
| Comparative Example 2 | 6/9 | 0.012/0.035 | 0.8 (1.5 − 0.7) | 3.4 |
| Comparative Example 3 | 7/9 | 0.012/0.035 | 1.2 (1.9 − 0.7) | 6.2 |
| Comparative Example 4 | 8/9 | 0.012/0.035 | 0.8 (1.4 − 0.6) | 3.2 |
| Comparative Example 5 | 1/13 | 0.012/0.035 | 0.1 (0.7 − 0.6) | 0.7 |
| Comparative Example 6 | 1/14 | 0.012/0.035 | 0.1 (0.7 − 0.6) | 0.7 |

| | Dynamic friction coefficient (F) | Adhesion property to the hard coat layer | Visibility | Durability A surface/ B surface |
|---|---|---|---|---|
| Comparative Example 1 | X (1.31) | X | X | — |
| Comparative Example 2 | ○ (0.56) | ◎ | X | ○/○ |
| Comparative Example 3 | ○ (0.58) | ◎ | X | ○/○ |
| Comparative Example 4 | ○ (0.54) | ◎ | X | X/○ |
| Comparative Example 5 | ○ (0.54) | X | ◎ | ○/○ |
| Comparative Example 6 | ○ (0.54) | X | ◎ | ○/○ |

INDUSTRIAL APPLICABILITY

The both surfaces-laminated polyester film according to the present invention is preferably used as optical application for example touch panel application, in which the visibility is especially important factor and more excellent transparency is required.

The invention claimed is:

1. A both surfaces-laminated polyester film comprising:
   a polyester film,
   a first coating layer which is formed on one surface of said polyester film and comprises a polymer containing ammonium base, an acrylate polymer containing polyethylene glycol and a crosslinking agent, and
   a second coating layer which is formed on another surface of said polyester film and comprises a polyurethane resin and a crosslinking agent.

2. A both surfaces-laminated polyester film according to claim 1, wherein in the first coating layer, the content of polymer containing ammonium base is 20 to 70% by weight, the content of acrylate polymer containing polyethylene glycol is 5 to 40% by weight and the content of crosslinking agent is 1 to 50% by weight based on the first coating layer; and in the second coating layer, the content of polyurethane is 10 to 80% by weight and the content of crosslinking agent is 1 to 50% by weight based on the second coating layer.

3. A both surfaces-laminated polyester film according to claim 1, wherein the counter anion of quaternary ammonium base of polymer containing ammonium base is an anion other than halogen anions.

4. A both surfaces-laminated polyester film according to claim 1, wherein the crosslinking agent is a melamine crosslinking agent or oxazoline crosslinking agent.

5. A both surfaces-laminated polyester film according to claim 4, wherein the melamine crosslinking agent is a methylolmelamine derivative obtained by condensing melamine and formaldehyde.

6. A both surfaces-laminated polyester film according to claim 4, wherein the oxazoline crosslinking agent is a polymer having an oxazoline group in a side chain thereof.

7. A both surfaces-laminated polyester film according to claim 6, wherein the polymer having an oxazoline group is a polymer obtained by polymerizing an addition polymerization monomer having an oxazoline group and the other monomer.

8. A both surfaces-laminated polyester film according to claim 7, wherein the other monomer is an acrylic monomer.

* * * * *